United States Patent [19]
Frazee et al.

[11] Patent Number: 5,366,749
[45] Date of Patent: Nov. 22, 1994

[54] PROCESS AND PRODUCT OF MAKING A SNACK FROM COMPOSITE DOUGH

[75] Inventors: Bradley C. Frazee, Idaho Falls; Clifford A. Stubbs, Iona; Veldon M. Hix, Idaho Falls; Miles J. Willard, 154 E. 49th S., Idaho Falls, all of Id. 83402

[73] Assignee: Miles J. Willard, Idaho Falls, Id.

[21] Appl. No.: 64,544

[22] Filed: May 19, 1993

[51] Int. Cl.$^5$ .............................................. A21D 8/02
[52] U.S. Cl. .................... 426/549; 426/438; 426/439; 426/441; 426/518; 426/519; 426/520; 426/550
[58] Field of Search ............... 426/438, 439, 549, 550, 426/441, 518, 519, 517, 520

[56] References Cited

U.S. PATENT DOCUMENTS

| | | | |
|---|---|---|---|
| 3,259,503 | 7/1966 | Tan et al. | 99/83 |
| 4,752,493 | 6/1988 | Moriki | 426/559 |
| 4,889,733 | 12/1989 | Willard et al. | 426/438 |
| 4,889,737 | 12/1989 | Willard et al. | 426/550 |
| 4,931,303 | 6/1990 | Holm et al. | 426/549 |
| 4,994,295 | 2/1991 | Holm et al. | 426/549 |
| 5,110,613 | 5/1992 | Brown et al. | 426/549 |
| 5,240,731 | 8/1993 | Bornhorst et al. | 426/549 |

FOREIGN PATENT DOCUMENTS

| | | | |
|---|---|---|---|
| 4179433 | 6/1992 | Japan | 426/549 |
| 1420505 | 1/1976 | United Kingdom | A23L 1/12 |

*Primary Examiner*—Helen Pratt
*Attorney, Agent, or Firm*—Hopkins, Roden, Crockett, Hansen & Hoopes

[57] ABSTRACT

A process for forming a snack product and a snack formed therefrom with discontinuous characteristics. The process includes forming a first highly cohesive dough and a second less cohesive dough matrix, combining the first and second discrete dough components into a composite dough sheet, cutting the dough sheet into a multiplicity of dough preforms, and frying the preforms to produce a snack with discontinuous characteristics.

22 Claims, 8 Drawing Sheets

Figure 7A
Figure 7B
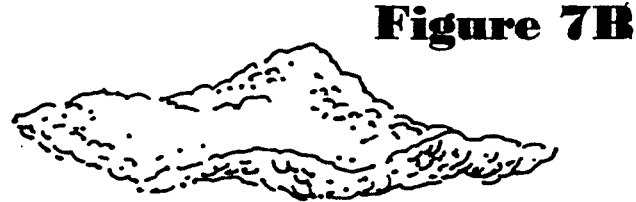
Figure 7C
Figure 7D
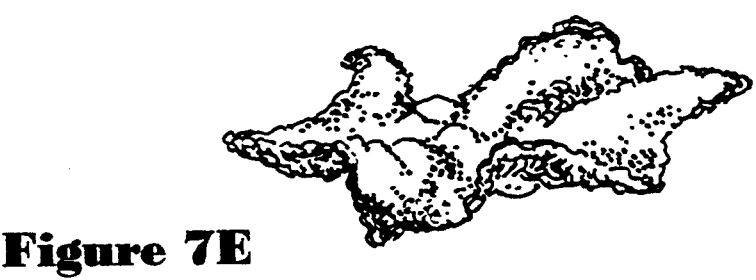
Figure 7E

PROCESS AND PRODUCT OF MAKING A SNACK FROM COMPOSITE DOUGH

BACKGROUND OF THE INVENTION

1. Field of the Invention

This invention relates to snack food products and, more particularly, to a novel fried snack chip made from a dough preform with discontinuous areas of highly cohesive and less cohesive dough compositions. A novel texture and appearance are apparent in the finished fried snack as a result of the discontinuous internal structure of the snack.

2. Description of the Prior Art

There have been a number of prior art techniques used to achieve unique appearance and structure of fried snack food products. U.S. Pat. No. 4,994,295 to Holm et al., assigned to the same assignee as the present invention, discloses products having unique textures and processes to control the size and quantity of surface bubbling of the chips when they are fried. These snack products are made, however, from a uniform well-mixed dough; therefore, differences in texture that would be perceived are simply due to differences in thicknesses between bubbled and unbubbled sections of the fried snack product. This type of bubbling has been noted in potato chips made from thinly sliced raw potatoes.

U.S. Pat. No. 3,259,503 to Tan describes a starch-containing dough mixture and discrete pieces or particles of a foodstuff completely foreign to the dough substrate. These ingredients are made into a dried snack pellet by means known to the art, after which the dried pellet can be fried to make a puffed, highly expanded snack product. As the result of the particles throughout, the fried chips have an irregular shape with a tendency to curl. The cited particles, such as nuts, however, have a texture and appearance totally foreign to the surrounding dough matrix.

U.S. Pat. No. 4,752,493 to Moriki describes hollow expanded snacks made from a sheeted dough comprising a combination of a highly expanding ingredient and a lower swelling capacity ingredient. Hot water is added to the dry ingredients which are mixed and kneaded into a completely homogenous dough which is sheeted and cut into small shaped units which are baked so that steam forms inside the two surface areas of the snack during frying.

U.S. Pat. No. 5,110,613 to Brown et al. discloses a method to prepare snack chips from a dry starch material mixed with a moist starch dough to produce a chip having a variation in texture. However, Brown et al. does not disclose a composite dough comprising of components with a high and a low specifically controlled degrees of cohesiveness. The dry starch material is not hydrated into a dough of different consistency from the matrix dough and hence can scorch during frying or baking.

Accordingly it would be desirable to create a composite dough which, when sheeted and fried, would exhibit randomly distributed areas of discontinuous phases having differences in texture and appearance and without the tendency for scorching during baking or frying.

SUMMARY OF THE INVENTION

Briefly, the present invention is a process for forming a dough and a snack product made therefrom with discontinuous characteristics. The process includes forming a composite dough having areas of significantly different rheological properties throughout, forming the composite dough into a dough sheet, cutting the dough sheet into a multiplicity of dough preforms and frying the preforms to produce finished snacks containing discrete areas with separate distinct characteristics. The first dough is formed by a process and ingredients chosen to provide a highly cohesive dough (HiCD). The second dough is formed by a process and ingredients to provide a low cohesive dough matrix (LoCDM) with adhesive properties such that the LoCDM and HiCD combination provide a composite sheetable dough for further processing such as cutting into dough preforms and frying.

In one embodiment of the invention a farinaceous starch-containing foodstuff is used for preparing the HiCD. Specifically, the ungelatinized farinaceous material is ground to a flour and mixed with water to a moisture content of approximately 22–40% by weight. The mixture is then heated to raise its temperature above the gelatinization temperature of the starch contained in the foodstuff.

A preferred embodiment of the invention includes using rice flour for the starch-containing foodstuff in the HiCD. After mixing the rice flour with water to a moisture content of approximately 22–40% by weight, the mixture is heated to a temperature above the rice-starch gelatinization temperature, normally 160°–165° F. (71°–74° C.) for United States grown, long grain rice to provide the HiCD.

The LoCDM is also prepared from starch-containing flours, additional ingredients, and water sufficient to give a moisture content of approximately 30–70% by weight, with a preferred moisture content of 40–50% by weight. These ingredients are not heated, as the ingredients are selected to have the proper extent of gelatinization to give the sired consistency of the LoCDM.

To produce the composite dough of this invention, the highly cohesive dough (HiCD) is mixed with the LoCDM, wherein the HiCD comprises about 10–70% of the total composite and the LoCDM comprises about 30–90% of the total composite dough. A critical step of the process is controlling mixing of the high and low cohesive dough components so as to achieve the desired particle size of the HiCD dough agglomerates distributed throughout the LoCDM. The composite dough is thus formed to have discontinuous characteristics throughout with different rheological properties and is then suitable for further processing such as cutting into dough preforms and frying to produce snack products with discernible discontinuous characteristics.

A preferred embodiment includes reducing the size of agglomerates of the cohesive dough phase while mixing it with the LoCDM. Another preferred embodiment of the invention includes combining the forming of the LoCDM and reducing the size of the HiCD while mixing with the LoCDM in one simultaneous step. Specifically, after the cohesive dough is formed, it is cut into smaller agglomerates while mixing it with the ingredients used to form the second dough thereby forming the second dough and combining the first and second doughs at the same time.

Once the HiCD and LoCDM are combined by forming and mixing or simultaneous combination of forming and mixing, as described above, the composite dough is then sheeted, cut into snack-size dough preforms, and fried to produce a snack having a non-uniform distribution of discontinuous characteristics.

The sheeted dough, dough preforms, and snack products of this invention contain narrow elongated sections of the HiCD due to the gradual conversion in the sheeter of the randomshaped cohesive agglomerates into non-uniform flattened elongated sections of the HiCD surrounded by the LoCDM.

The fried snack prepared from the randomly distributed HiCD agglomerates in the LoCDM adhesive dough matrix has corresponding areas of firm, crunchy texture interspaced randomly with a softer matrix.

BRIEF DESCRIPTION OF THE DRAWINGS

The invention may be better understood and further advantages and uses thereof may become more readily apparent when considered in view of the following detailed description of the exemplary embodiments, taken with the accompanied drawings, in which:

FIGS. 7A-E show a plan view of fried snack pieces representing the five points on the wrinkle scale which is subsequently described more fully.

DETAILED DESCRIPTION OF THE PREFERRED EMBODIMENTS

This invention provides a snack dough preform and a finished snack product having a composite mixture of discontinuous components each having different rheological properties.

The process for forming the sheeted dough pieces and finished snack with discontinuous characteristics can be generally divided into four steps: (A) forming a first dough having a high degree of cohesion; (B) subdividing the first dough and distributing it randomly throughout a second dough of lower cohesion; (C) passing the composite dough between rollers to produce a sheeted dough with discontinuous characteristics and cutting the sheeted dough into a multiplicity of snack size dough pieces; (D) optionally pre-drying the dough pieces and frying them to produce a snack with discontinuous characteristics.

Each of these steps will now be described in greater detail.

A. Forming the Highly Cohesive Dough (HiCD)

1.0 Ingredients. The HiCD can be produced from a number of starch-containing foodstuffs at conditions selected to give the desired cohesiveness. This dough may be formed from raw or pre-gelatinized corn solids, potato solids, rice solids, starches, and modified starches and may include other ingredients such as: flavorings, oils, emulsifiers, and the like. When using farinaceous ingredients in which the internal starches have not been gelatinized, i.e. are in the raw state, it is necessary to raise the temperature of the ingredients and the added water to well above the gelatinization temperature of the starch in the starch-containing ingredient. For example, in a preferred embodiment based on the use of rice flour produced from United States grown, long grain rice, the ingredients must be raised above the gelatinization temperature of the rice starch contained therein, specifically 160°-165° F. (71°-74° C.). In practice it has been found that a more complete gelatinization results from heating the rice flour to about 212° F. (100° C.) and provides a greater cohesiveness to the dough and improved texture of the finished snack product.

Figure 1:
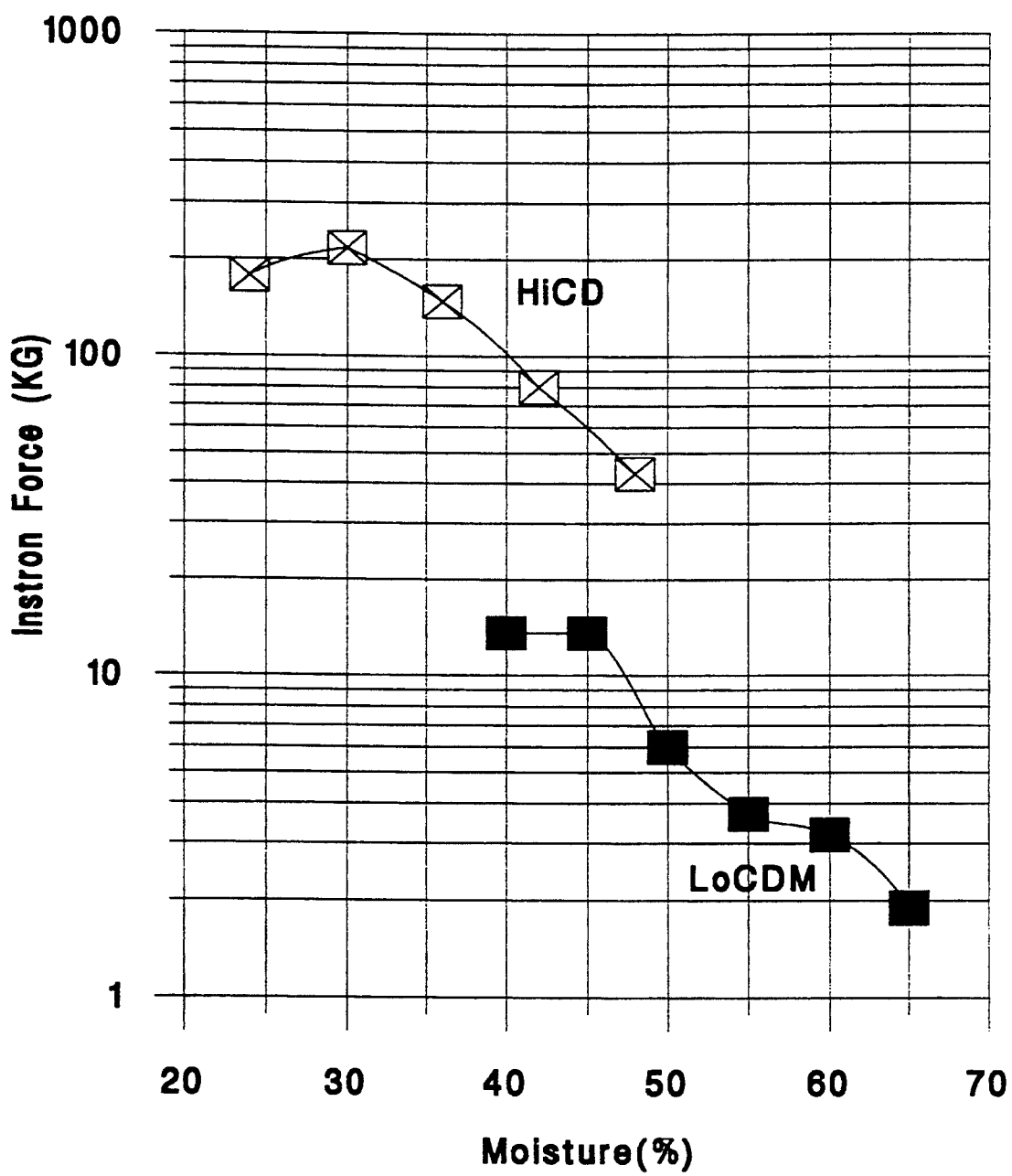
FIG. 1 is a graph showing the relationship of moisture content versus cohesiveness for a HiCD (prepared from a cooked rice gel) and for a LoCDM (measuring the pressure to compress the dough) in a Kramer Shear Press Universal Cell with a Model TM Instron unit.

An equally critical feature is the moisture content of the HiCD component. FIG. 1 shows the relationship of moisture content to the cohesiveness of cooked rice-based HiCD as measured by the compression of the dough through a Kramer Shear Press Universal Cell with five shear plates in a Model TM Instron unit. Analysis of experimental data demonstrated that the preferred cohesiveness of the dough resulted when the moisture content was held between about 22% to 38% moisture with an optimum range of about 30-38% moisture in the dough. When raw corn flour was used for the starch-containing foodstuff, the optimum moisture content was about 36%. Ground dehydrated potatoes which had been previously blanched were also used for the starch-containing foodstuff for which the optimum moisture content was about 31%.

Applicants have also found that a simple visual/manual rating scheme is useful for rating various doughs used in the production of snack food products. The "Dough Rating Scale" devised for such measurements is as follows:

1. Dry, friable powdery dough—can be squeezed by hand into a ball only with difficulty.
2. Dry, friable—more easily squeezed into a ball.
3. Easily squeezed into a ball which breaks apart when dropped.
4. Friable, with some small agglomerates remaining after mixing.
5. Borderline friable/cohesive, discharges with .ease from mixer—many random agglomerates after mixing. Hand-formed ball does not break easily when dropped.
6. Predominantly agglomerates which are easily molded into a ball which feels wet—discharges from mixer with difficulty.
7. All large agglomerates which discharge with difficulty from mixer—hand-formed ball does not break when dropped.
8. Completely uniform, cohesive mixture which discharges from mixer as a single non-adhesive dough.

9. Uniform adhesive dough similar to bread dough—cannot be discharged from mixer except as single unit which sticks to fingers.

2.0 Heating Methods. Heating the cohesive dough ingredients to a temperature above the gelatinization temperature of the starch contained in the foodstuff to provide a highly cohesive dough (HiCD) can be accomplished by a number of different methods. These include steam injection with a Stephan Processor made by Stephan Machine Works (Germany), a cooker extruder, a swept surface heat exchanger, electrical current, microwave, or other heat source. Pre-gelatinized, starch-containing materials can be substituted for the cooked starch-containing material.

3.0 Preferred Method. A preferred method of forming the HiCD is to combine long-grain rice which has been ground to pass a United States No. 20 mesh (840 micron) screen with the desired amount of water in a Stephan Model HC44E processor fitted with two serrated knives. With the baffle operating and knives running at about 800 rpm, steam at 60 psi is injected to raise the temperature of the mixture to about 210° F. (99° C.) and hold it there for about 4 minutes, after which the pressure is vented and the mixture is cooled by vacuum to about 80°–90° F. (27°–32° C.), followed by additional chopping for about 10 seconds at high speed (1650 rpm), after which the cooked gel is dumped from the mixer.

B. Forming the Low Cohesive Dough Matrix (LoCDM)

1.0 Ingredients. The low cohesive dough matrix can be made from a number of starch-containing foodstuffs conventionally used as ingredients in snack products. These can include raw or gelatinized farinaceous foodstuffs, such as raw or pre-gelatinized corn flour, flours made from legumes (such as dried peas or beans, etc.), potato flakes (particularly flakes known as low leach-low peel flakes described in United Kingdom Patent No. 1,420,505 by Purves and Snively), starches (such as amioca starch, corn starch, and potato starch), ingredients which function as dough conditioners, and release agents (such as emulsifiers, oils or gums, and seasonings).

2.0 Preparation methods. In one embodiment of the invention, two separate doughs with different consistencies are prepared, after which the doughs are combined to give the composite dough, the composite dough preform and the resulting fried snack product. Because of the difficulty in reducing the particle size of the HiCD agglomerates, after mixing the two dough components together, other procedures are preferred.

A preferred embodiment for producing the composite dough of this invention is as follows: a mixture of dry ingredients is prepared from the following: low leach, low peel potato flakes, white corn meal, flavoring and coloring agents. The dry ingredients are blended at high speed for 15 seconds in a Stephan UM44E mixer fitted with two serrated blades. To this dry mix is added the desired amount of cooked rice HiCD prepared as described above. The HiCD, consisting solely of the cooked, cooled rice gel is at this point an extremely cohesive mass comprising agglomerates of gel ranging in size from about 5 mm to 10 mm in diameter, most of which are fused together into larger agglomerates. A blend of vegetable oil and GMO (glycerol monooleate, a food grade emulsifier known to reduce the stickiness of starch-based doughs) is added to the mixer after which the dry ingredients and HiCD are blended for 10 seconds. During the mixing the HiCD rice gel is reduced in size to a maximum diameter of about 20–30 mm and, as the rice gel agglomerates are now coated with a portion of the dry ingredients, it is possible for the mixer to subdivide the HiCD into even smaller agglomerates. The preparation of the composite dough is continued by adding water and mixing for an additional 45 seconds, during which time the HiCD is reduced in size to small agglomerates with a maximum diameter of approximately 10 mm. These particles are distributed randomly throughout the newly-formed dough matrix which is now a somewhat cohesive dough with sufficient adhesive properties to contain the HiCD agglomerates. By varying the degree of mixing and the relative cohesiveness of the two dough fractions which, in turn, control the size distribution of the HiCD agglomerates, the texture and appearance of the finished product can be adjusted to have a wide range of consistency and appearance.

Referring again to FIG. 1, a comparison can be made of the relative rheological properties of the HiCD and LoCDM prepared according to the process of this invention. The highly cohesive HiCD requires about 200 kg force at the maximum cohesiveness shown at about 30% moisture content. In contrast, the LoCDM at its minimum moisture content of 45% moisture requires only about 15 kg for compression, roughly 14% of the pressure required for the HiCD at its maximum.

Figure 2:
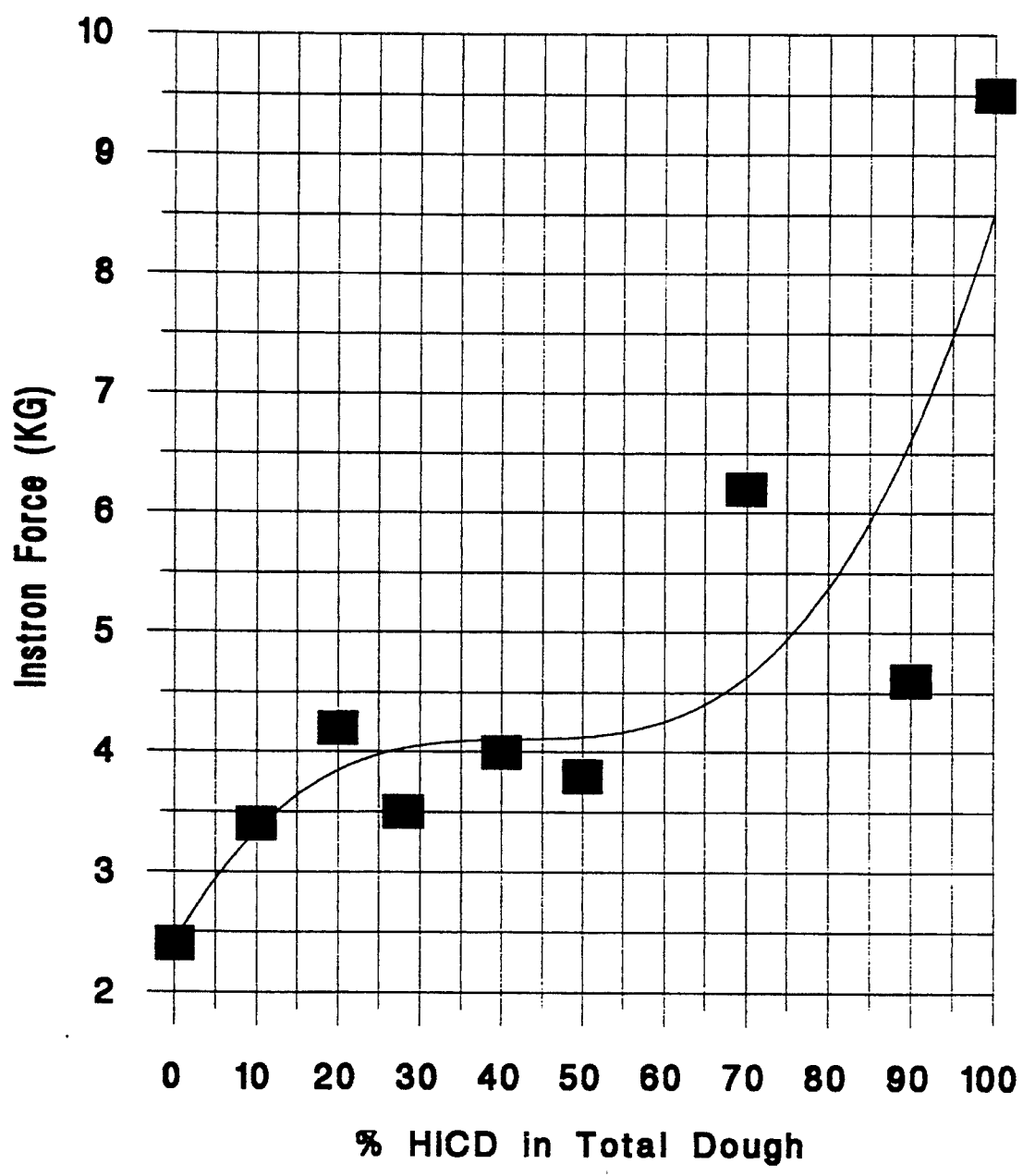
FIG. 2 is a graph wherein the Instron compression force of the composite dough is plotted against the level of HiCD (cooked gel rice agglomerates) in the dough.

3.0 Composition of composite dough. To produce the composite dough of this invention, the highly cohesive dough (HiCD) is mixed with LoCDM so that particles of the desired size of the HiCD agglomerates are randomly distributed through the LoCDM. FIG. 2 illustrates the effect on the Instron compression force required to penetrate the composite dough in a series of samples in which the percent HiCD in the composite dough was increased from 0 to 100% at 10% intervals. From about 10% to 60% HiCD, the composite dough exhibited an Instron force of from about 3.4 to 4.3 kg illustrates that a consistent composite dough can be produced within this range. The preferred range for commercial production was found to be between 25% and 55% HiCD in the composite dough, with the optimum at about 45% HiCD.

C. Forming the dough sheet and cutting into individual dough preforms.

Figure 3:
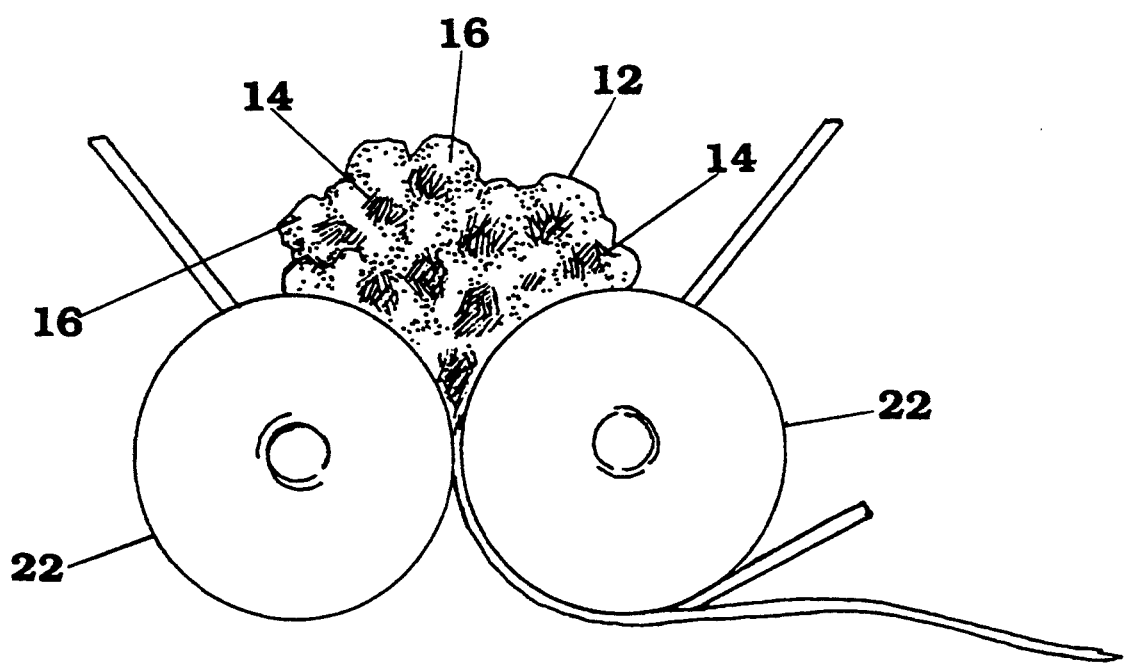
FIG. 3 is a schematic diagram showing the composite dough made up of the HiCD agglomerates and the LoCDM component being sheeted in a conventional two roll sheeter.

FIG. 3 shows a schematic drawing of the composite dough 12 made up of HiCD agglomerates 14 contained within the LoCDM 16 being sheeted between a pair of sheeting rolls 22 such as are common in the baking and snack industry.

Figure 4:
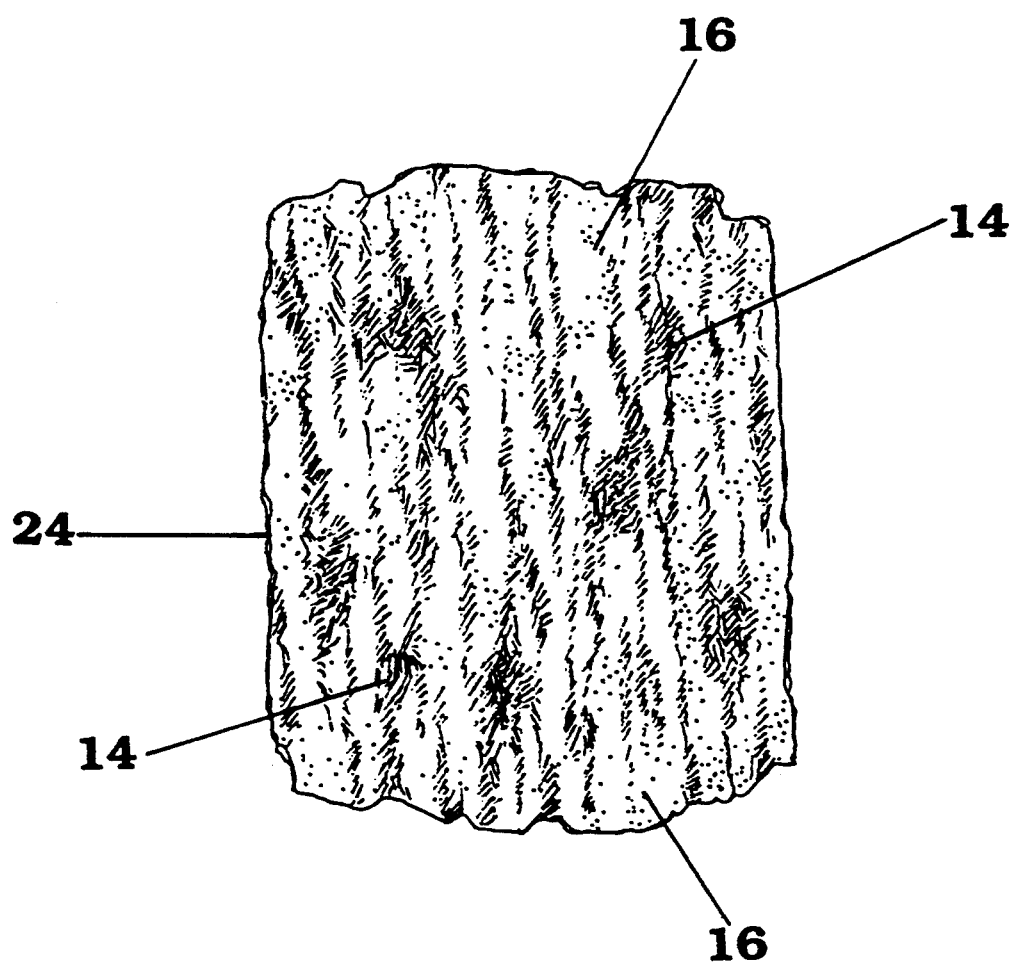
FIG. 4 is a topographical view of a section of the sheeted composite dough.

As the composite dough is compressed between the rolls, the HiCD agglomerates become flattened and elongated and appear as irregular striations in the sheeted dough. FIG. 4 shows a schematic drawing of a section of the sheeted dough 24 showing the striations 14 formed from the HiCD agglomerates enmeshed in the LoCDM 16.

The composite dough is sheeted to a thickness from about 0.5 to 1.5 mm, with a preferred range of 0.75 to 1.0 mm, although because of the presence of the striations formed from the HiCD agglomerates, the thickness is not consistent across the dough sheet. In practice, it has been found that the sheet thickness is preferably controlled by determining the weight of a disc of dough cut from the dough sheet. In a preferred method, five discs of dough having a diameter of 3.1 inches (79 mm) are cut from the dough sheet and weighed. The thickness of the dough is controlled so that the combined five discs have a weight of from about 18.7 to about 19.7 gm.

Following sheeting, the dough sheet may be "dockered" such as with a flexible bristle brush as described in U.S. Pat. No. 4,889,733, assigned to the same assignee as the present invention, referred to and incorporated herein, to prevent the formation of bubbles or pillows as sometimes may occur with sheeted snacks during frying.

Whether dockered or not, the dough sheet is then cut into desired finished snack shapes such as, but not limited to, circles, squares, rectangles, hexagons, and the like by means of a conventional rotary cutter.

One of the unique aspects of this invention is the differing reaction of the HiCD agglomerates and the LoCDM during the steps of cutting, predrying, and frying. As the composite dough is sheeted between the sheeting rolls, stress forces are created in the dough sheet as a result of the elasticity of the dough. Since the HiCD agglomerates are more cohesive and elastic than the LoCDM, the stress forces developed in the areas of the dough sheet where striations of the HiCD agglomerates occur are greater than in the surrounding areas of the LoCDM.

When the dough sheet is cut, the stress forces are at least partially released and some shrinkage of the cut pieces occurs. Since the areas of HiCD striations have developed more stress forces due to greater cohesiveness and elasticity than the areas of LoCDM, they tend to shrink more upon cutting. This differential shrinkage causes the dough pieces to wrinkle or curl to give the preferred non-uniform appearance and contributes to the unique textural qualities of the product.

Figure 5:
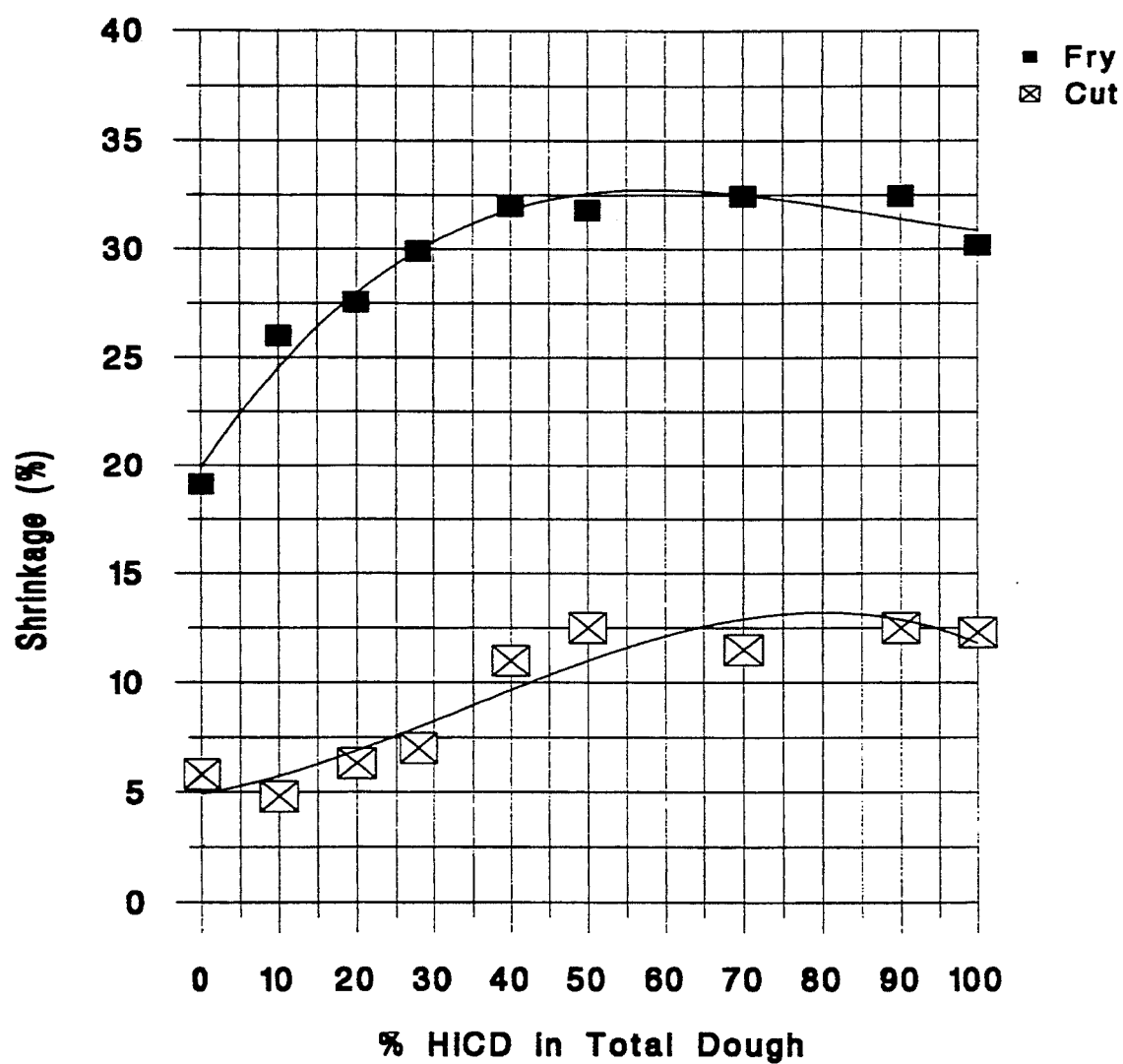
FIG. 5 is a graph showing the effect of HiCD (cooked rice gel agglomerates) level on the shrinkage of dough pieces upon cutting into snack shapes and during subsequent frying.

FIG. 5 shows the effect of the HiCD level in the dough on the degree of shrinkage in the cut pieces. Although the greatest degree of shrinkage occurs at a HiCD level of 70% to 90% in the dough, the level of shrinkage at the preferred range of HiCD content of 45% to 55% is more than double that at lower levels of 0–20% HiCD. The effects of this differential shrinkage are more pronounced during frying and will be discussed in more detail in the discussion of the frying process.

D. Frying the dough preforms with or without predrying.

Following cutting and, optionally, predrying, the dough preforms are fed into hot oil at a temperature of about 320° F. (160° C.) to about 380° F. (193° C.) or, more preferably, from about 345° F. (174° C.) to about 365° F. (185° C.) in a continuous fryer and fried for from about 10 seconds to about 50 seconds or, in a preferred method, for about 15 seconds to about 25 seconds wherein the moisture content of the pieces is reduced to 2% or less. After frying, the fried pieces are drained to remove excess oil and seasoned as desired.

Referring again to FIG. 5, the effect of the HiCD level in the composite dough on shrinkage of the dough preforms during frying is illustrated. This chart shows that the maximum, or optimum, level of shrinkage in the fried pieces occurs when the HiCD level is in the preferred range of 20% to about 70% or, more particularly, in the range of 45% to about 60%.

Figure 6A:
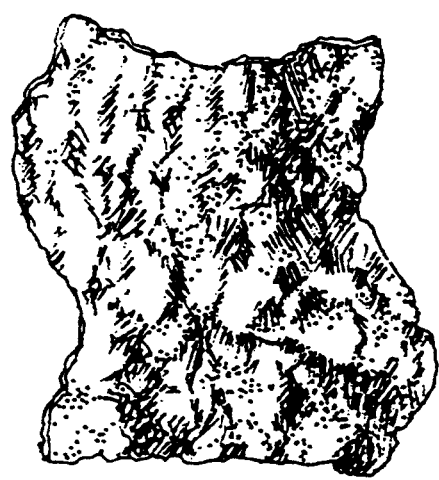
FIG. 6A is a topographical view of a fried snack piece showing the non-uniform, wrinkled, discontinuous characteristics created by the composite dough.

Fried snacks made from the composite dough of this invention may be fried with or without a preliminary predrying step prior to immersion of the dough preforms cut from the composite dough in hot oil. U.S. Pat. No. 4,994,295, assigned to the same assignee as the present invention, referred to and incorporated herein, discloses products with controlled surface bubbling of the chips resulting from a predrying step similar to that discussed here. The products of the present invention made from the composite dough as described herein do not bubble similarly to those in Patent '295 because of the discontinuous composition of the dough preform. However, predrying the composite dough pieces can serve to improve the crispness of the fried snack and lower the overall fat content. Predrying does tend to reduce the degree of difference between the HiCD striations and the LoCDM areas in the dough preforms, and the fried pieces are flatter and less wrinkled or curled. This may be better illustrated by referring to the topographical drawings of FIG. 6. FIG. 6A shows a fried snack piece which was not predried before frying. This piece obviously has a rougher surface and shows more evidence of shrinkage and wrinkling than the flatter, smoother piece shown in FIG. 6B, which was predried before frying.

Snack products of this invention which are made from dough preforms which have not been partially dried prior to frying exhibit the unique property of forming a wrinkled, randomly-shaped surface. Examination of various dough formulations and, particularly, the separate HiCD and LoCDM components making up the composite dough, reveal that, when sheeted and fried separately, the two components have differing degrees of shrinkage during frying. FIGS. 7A–E illustrate a wrinkle scale used as a visual guide for evaluating wrinkled samples in which five levels of wrinkling are identified according to the following scale:

Wrinkle Scale

Using a representative sample of 10 chips, each chip is rated using the following scale, and the results averaged to give the wrinkle scale value:

1=No curvature, totally flat chip (FIG. 7A)
2=Mostly flat surface with some gradual curves
3=Slightly irregular surface with a few bumps or wrinkles and some gradual curves (FIG. 7C)
4=Moderately irregular surface with several bumps or wrinkles and tighter curves (FIG. 7D)
5=Extremely irregular surface composed of deep ravines and high peaks (FIG. E)

In addition, a procedure for determining the height of the wrinkles on the fried pieces was developed as a further method of measuring the effect of combining the HiCD and LoCDM components:

Wrinkle Height Measurement Procedure

Equipment: Starrett gauge with 0.5 inch (1.27 cm) diameter flat mandrels

1. Open mandrels and place chip in gauge with one edge just overhanging the mandrel.
2. Allow the mandrel to close, allowing the chip to pivot freely if necessary.
3. Read height off gauge and record.
4. Repeat procedure with five other points around the periphery of the chip and one in the middle of the chip (measurements total).
5. Repeat using 10 chips total, for a total of 70 measurements.
6. Record the average of the 70 wrinkle height measurements.

For optimum wrinkling, the particle size of the HiCD agglomerates must be large enough to give substantial elongated areas of HiCD throughout the dough preform. For example, a dough with about 35% agglomerates larger than 4.7 mm diameter has a panel wrinkle score of 3.5, whereas a dough preform with the same LoCDM composition but with about 13% agglomerates larger than 4.7 mm diameter has a wrinkle score of only 2.3.

Figure 8:
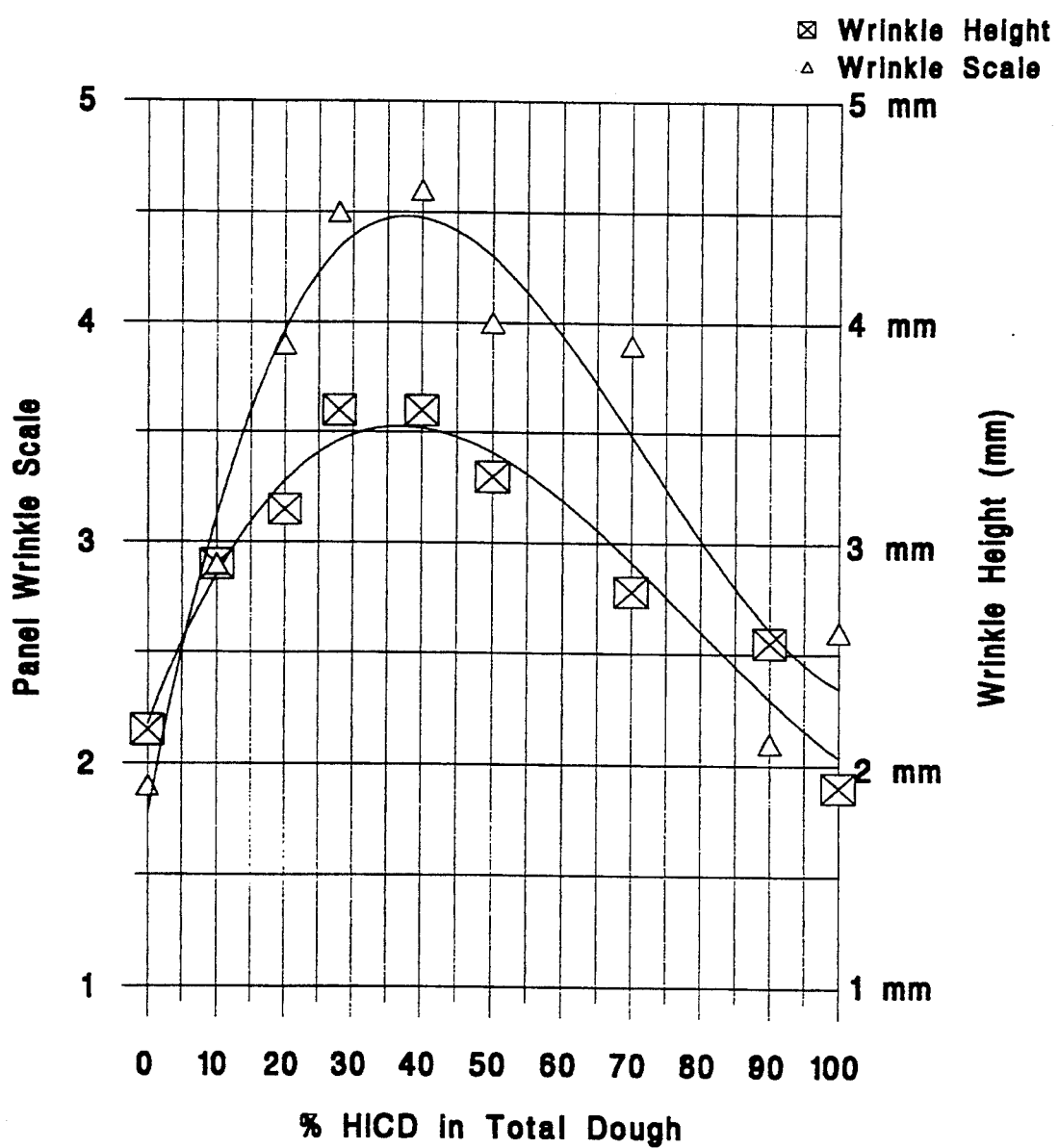
FIG. 8 is a graph showing the effect of the level of HiCD (cooked rice gel agglomerates) in the composite dough on the wrinkle height and wrinkle scale value of fried snack pieces made from the dough.

FIG. 8 is a chart showing the effect of the level of HiCD agglomerates in the composite dough on the wrinkle scale value and the wrinkle height measurement. This chart illustrates that the maximum, or most desirable, level of wrinkling occurs when the level of HiCD in the composite dough is in the range of 10% to about 70% or, more preferably, from about 25% to 55%.

In conclusion, what has been disclosed is a unique snack made from a random distribution of HiCD and LoCDM so as to provide a snack piece with discontinuous characteristics, such as texture, taste, undulating surface, mouth appeal, and color. The fact that these characteristics are discontinuous can be demonstrated by soaking the finished fried snack in water for 24 hours and then examining the residue. The LoCDM portions of the snack, being softer, melt away in the water making a paste, whereas the HiCD portions retain their integrity and unity.

Examples Of Preferred Embodiments Of The Invention:

Pilot plant experiments were made to demonstrate a method for producing a unique, sheeted, fried snack product from a composite dough containing two components of varied rheological properties.

EXAMPLE 1

This test was made to determine the effect of predrying the dough preforms before frying versus frying without predrying. For this series, the highly cohesive dough (HiCD) was produced from rice meal as described below. The low cohesive dough matrix (LoCDM) was produced from a number of conventional dry snack ingredients.

Rice Meal No. 1 from Riviana Foods was sifted through a United States No. #16 (1.18 mm) mesh screen to remove oversize particles. The resulting screen analysis of the rice meal is shown in Table 1:

TABLE 1

| Particle Size Analysis of Ground Rice | |
|---|---|
| Screen Size | Percent |
| On U.S. 20, 840 mm | 3.0 |
| On U.S. 40, 420 mm | 57.0 |
| On U.S. 60, 250 mm | 20.0 |
| On U.S. 80, 177 mm | 8.0 |
| On U.S. 100, 149 mm | 8.0 |
| On U.S. 200, 74 mm | 4.0 |
| Through U.S. 200, 74 mm | Trace |

A Model HC44E Stephan batch cooker/processor fitted with two serrated knives and provision for a supply of air, water, and steam at 60 psi (413 kPa) was used to prepare the HiCD from the rice meal. The mixer was preheated to an internal temperature of about 210° F. (99° C.) by injecting steam for about 3 minutes, opened, and wiped dry. Then, 13.2 lbs (6 kg) rice meal and 15 gm glycerol monooleate (GMO) emulsifier were placed in the mixer. The mixer was turned on and 3.5 lbs (1.6 kg) water was added and mixed uniformly. Steam was injected to heat the rice and water to 210° F. (99° C.) with baffle and knives operating for 4 minutes, after which, the pressure, normally at 4.4 psi (30 kPa) maximum, was vented. Vacuum was applied to the contents of the mixer for a period of about 6 minutes, after which the dough temperature had decreased to about 80°-90° F. (27°-32° C.) at a vacuum of about −11.6 psi (−80 kPa). Cooling water was then circulated through the jacket, and the vent opened to release the vacuum. The cooked ingredient was chopped for 10 seconds at 1650 rpm, after which it was removed from the mixer, covered, and until required.

For preparation of the LoCDM, a mixture of dry ingredients was prepared from LP/LL potato flakes, 5.37 lbs (2.44 kg); white corn meal, 3.31 lbs (1.50 kg); annatto coloring, 0.26 gm; turmeric, 0.40 gm; brownulated sugar, 274 gm; and salt, 63 gm. The dry ingredients were added to a Stephan UM44E mixer and blended at high speed for 15 seconds. Then, 12.93 lbs (5.88 kg) of the cooked rice HiCD was added together with a blend of 127 gm of vegetable oil and 5.35 gm of GMO which had been heated and stirred before use. These ingredients were blended for 10 seconds, after which 1.33 gm liquid malt flavoring suspended in 6.5 lbs (2.9 kg) of 80° F. (27° C.) water was added through a funnel over 20 seconds. The mixing was continued for a total time of 55 seconds. During mixing, the HiCD was reduced in size to small agglomerates with a maximum diameter of approximately 10 mm. The HiCD agglomerates, originally coated with dry ingredients during the preliminary chopping phase in the UM44E mixer, were now randomly distributed through the LoCDM dough formed by the hydration and mixing of the dry ingredients. By varying the degree of mixing and the cohesiveness of the two dough fractions, which control the size distribution of the HiCD agglomerates, the texture and appearance of the finished product can be adjusted to have a wide range of consistency and appearance.

The composite dough was then sheeted between two T. L. Green 12-inch (30.5 cm) diameter sheeting rolls 12 inches (30.5 cm) wide, operated with cold water at about 55° F. (13° C.) circulating through the rolls. The thickness of the sheet was controlled by measuring five 3.1-inch (7.9 cm) diameter round disks to a weight of 19.2 gm. Thickness measurements are not used for the snack dough of this invention because point-to-point variations in dough consistency. The sheeted dough was dockered with a rotating flexible dockering brush to regulate the size of bubbles produced during subsequent frying, as described in U.S. Pat. Nos. 4,889,733 and 4,889,737. The dockered sheet was cut into dough pieces about 56 mm long using a conventional rotary cutter.

Figure 6B:
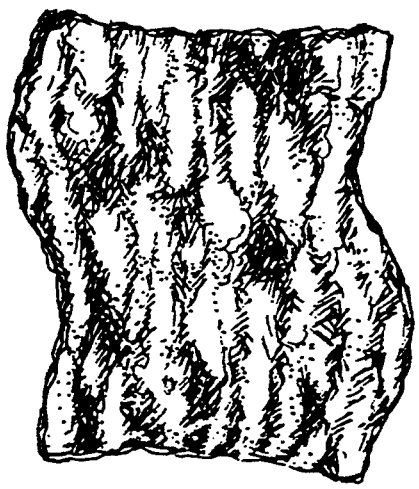
FIG. 6B is a topographical view of a fried snack piece from the same composite dough showing reduced wrinkling and flatter configuration due to predrying prior to finish frying.

Example 1A: In this test, dough pieces were surface dried for a period of 20 seconds at 650° F. (343° C.) in a gas-fired Spooner oven as described in U.S. Pat. No. 4,931,303. The surface-dried chips were fried at 360° F. (182° C.) for 18-22 seconds in a blend of corn and cottonseed oils in a pilot plant fryer to an Agtron color of 56-57, after which the product was seasoned appropriately. FIG. 6B shows a topographical drawing of the snack piece fried after predrying.

In this and other tests described herein using a predrying procedure, the frying time was reduced to compensate for the moisture lost in predrying.

The finished product had a unique crisp texture which varied from piece to piece as a result of the random combination of the various-sized firm particles of the HiCD agglomerates dispersed throughout the more tender matrix of the LoCDM dough.

Example 1B: It was discovered that a highly wrinkled fried snack product could be produced by omitting the partial drying of the surfaces of the dough preform prior to frying. Because of the differences in shrinkage and expansion of the two dough components, the fried product had an undulating, randomly wrinkled structure, as well as the unique variation in texture throughout. A topographical drawing of this product is shown in FIG. 6A. The wrinkled appearance of Example 1B was noticeably different from the gently curved, generally flat product of Example 1A (FIG. 6B).

EXAMPLE 2

Experiments were conducted to measure the effect longer cooking on the size of HiCD agglomerates in the dough and subsequently on the wrinkling of the finished fried product. Rice meal was produced from conventional long-grain white rice in a GP140 plate grinder to pass through a United States No. 16 (1.19 mm) mesh opening, after which 30% was retained on a United States No. 40 (0.42 mm) screen. cooked HiCD agglomerate was prepared from 13.54 lbs (6.15 kg) ground rice and 6.46 lbs (2.94 kg) white corn meal and 6 lbs (2.73 kg) of water as described in Example 1. The HiCD agglomerate for Example 2A was held under pressure at 210° F. (99° C.) in the Stephan HC44E processor for 4 minutes; an additional test, Example 2B, was held for 8 minutes.

The LoCDM was prepared from the following mixture of dry ingredients: yellow pea flour, 2.54 lbs (1.15 kg); LP/LL flakes, 3.17 lbs (1.44 kg); amioca starch, 2.03 lbs (0.92 kg); sugar, 139 gm; salt, 65 gm; vegetable oil, 131 gm; and glycerol monooleate, 16.3 gm.

The two dough components were mixed as described in Example 1, by combining 14.75 lbs (6.7 kg) HiCD with the LoCDM mixture and 6.73 lbs water, after which samples were removed for screen analysis. Approximately 500 gm of the dough was placed on the top sieve of a stack of sieves as listed below in Table 2. A fine spray of cold water was then directed sequentially at each screen to remove the adhering dough matrix solids. As each screen was sprayed and removed in turn, the product was transferred to paper towels on which it was allowed to dry prior to weighing.

Each dough was sheeted as described in Example 1 under substantially the same conditions after which the dough preforms were conveyed without drying immediately to the fryer where they were fried 45 seconds at 345° F. (174° C.).

The fried products were evaluated by a trained test panel using the wrinkle scale described earlier. FIG. 7 shows a graphic description of this scale.

In addition, a wrinkle height test was performed in the laboratory which measured the height at seven random locations on each of ten chips randomly selected from each sample as previously described.

Comparing Example 2A versus Example 2B demonstrated that with increased cook time, Example 2B agglomerate broke down into smaller particles which resulted in less wrinkling. The relationship of agglomerate size to product wrinkling is shown in Table 2.

TABLE 2

| Effect of HiCD Agglomerate Size on Wrinkling | | |
| --- | --- | --- |
| HiCD Agglomerate, % | | |
| on US ½, 12.7 mm | 0.0 | 0.0 |
| on US ⅜, 9.5 mm | 0.0 | 0.8 |
| on US ¼, 6.4 mm | 18.4 | 4.6 |

TABLE 2-continued

| Effect of HiCD Agglomerate Size on Wrinkling | | |
| --- | --- | --- |
| on US 4, 4.7 mm | 16.4 | 8.0 |
| on US 10, 2.0 mm | 43.2 | 41.6 |
| through US 10, 2.0 mm | 22.0 | 45.0 |
| Average wrinkle height, mm | 3.23 | 2.65 |
| Panel wrinkle score | 3.5 | 2.3 |

EXAMPLE 3

Example 3A: This test was based substantially on the conditions of Example 1 to quantify the differences between the individual HiCD and LoCDM doughs. Each dough was prepared separately, after which a composite dough was prepared by combining the two components in a ratio of 25% HiCD to 75% LoCDM, as-is basis. The characteristics of each dough was first rated using the "Dough Rating Scale" described above. The consistency of each dough was measured with an Instron Model TM fitted with a Kramer Shear Press Universal Cell with five shear plates, operated at a cross-head speed of 4 cm per minute and a chart speed of 10 cm per minute. The force needed to cut through the samples was documented on a strip chart recorder and later analyzed. Table 3A-1 illustrates the results obtained:

TABLE 3A-1

| Shear Force of Dough Components | | | |
| --- | --- | --- | --- |
| | HiCD | LoCDM | Composite Dough |
| Dough type | 8.5 | 5 | 6 |
| Dough temperature, °F. | 80 | 77 | 84 |
| Dough moisture, % | 37.7 | 41.9 | 40.5 |
| Instron peak, kg | 46.0 | 22.5 | 25.5 |

The Instron tests demonstrated that 46 kg of force is required to shear the HiCD phase and only 22.5 kg to shear the LoCDM. This illustrates the significant difference in consistency between the HiCD and LoCDM phases.

The composite dough made from 25% HiCD and 75% LoCDM had a 25.5 kg shear force illustrating that the cohesive HiCD particles distributed randomly throughout the LoCDM matrix have a minimal effect on the consistency of the combined dough.

All three samples were sheeted at a 1 mm target thickness and cut with a 3.1-inch (7.9 cm) diameter disk normally used for determining the dough sheet thickness. Measurements of the cut disk diameter were made after cutting and after frying to determine the shrinkage of the three samples. The relative speed of the dough sheet formed in the sheeting rolls and the conveying speed away from the rollers were held constant to give trouble-free removal of the dough sheet from the sheeting rolls and to avoid tearing of the dough sheet.

To prevent folding or distortion of the round hand-cut dough preforms, the samples were carefully fried in a batch fryer at 360° F. (182° C.) for 40 seconds by placing them individually on a long-handled spatula and carefully lowering into the oil.

The variation in the shrinkage after cutting and frying illustrates the unique behavior of the composite dough of this invention and is shown in Table 3A-2:

TABLE 3A-2

Shrinkage of Cut and Fried Dough Component Discs

|  | HiCD | LoCDM | Composite Dough |
|---|---|---|---|
| Wt 1 disk, unfried, gm | 5.6 | 5.2 | 5.0 |
| Sheet thickness, mm | 1.2 | 0.95 | 1.0 |
| Cutter diameter, inch | 3.1 | 3.1 | 3.1 |
| Diameter after cut, inch | 3.0 | 2.64 | 3.01 |
| Shrinkage after cut, % | 3.7 | 14.8 | 2.9 |
| Diameter after fry, inch | 2.4 | 2.56 | 2.46 |
| Shrinkage in fryer, % | 19.4 | 2.6 | 17.7 |
| Total shrinkage, % | 22.6 | 17.4 | 20.6 |
| Thickness fried disc, mm | 1.43 | 1.13 | 1.24 |
| Expansion ratio | 1.19 | 1.19 | 1.24 |

The HiCD dough shrinks only 3.7% after being cut but shrinks 19.4% more during frying to give a total shrinkage of 22.6%. In contrast, the LoCDM dough shrinks dramatically after being cut, 14.8%, and only 2.6% during frying to give a total shrinkage of 17.4%. The 5.2% difference in total shrinkage for the HiCD and LoCDM causes the composite snack to be wrinkled and distorted to form a unique snack. The composite dough shrinkage falls between the separate LoCDM and HiCD phases in all cases.

Example 3B: The effect of HiCD level on cohesiveness, shrinkage, and wrinkling in the finished product was determined in a series of nine samples in which the level of HiCD in the total dough ranged from 100% to 0% mfb (moisture-free basis). Samples were prepared and fried according to the process described in Example 1. Instron consistency dough shrinkage, wrinkle scale, and wrinkle height measurements were used as before to evaluate the products.

As the percentage of HiCD increased, the cohesiveness of the dough as measured by Instron compression forces gradually increased up to a level of 25%, then leveled off up to about 55%, then increased dramatically beyond 55%. This data is shown in FIG. 2.

Dough shrinkage levels during frying increased as the HiCD (cooked rice) level in the formulation increased until about 40% cooked rice was reached, after which the shrinkage remained constant (FIG. 5). The wrinkling peaked at 30% to 50% HiCD in the formula, then dropped off as the level was increased above 50%, as shown in FIG. 8.

EXAMPLE 4

Previous examples described the process as demonstrated in a Model HC44E Stephan processor in which the farinaceous meal, specifically rice meal, was combined with water and heated to above the temperature required for gelatinization of the rice starch contained in the meal. Additional gelatinization procedures known in the art were tested with the same rice meal as follows:

Example 4A: HiCD Formation by Microwave. Fifty (50) gm of 80° F. (27° C.) water were mixed uniformly into 100 gm rice meal by hand with a fork to give approximately 40% moisture. The mixture was microwaved for 3 minutes on a rotating table in an open container at high power setting (1500 watts). When combined with this amount of water, the resultant cooked rice had a hard, dry, brick-like, untypical texture because of water loss during heating.

In a second test, the initial moisture content was increased to 50%, and microwaving was done at a power setting of 750 watts for 6 minutes. This rice/water mixture had an ideal final moisture of 38% and a rubbery cohesive texture similar to that made in the Stephan processor. It was concluded that a rice gel prepared by this method could be used in making sheeted fried snacks when chopped into appropriate agglomerates.

Example 4B: HiCD Formation using Electrical Current. Rice meal was mixed with sufficient water containing 2% salt to give a 34% moisture content mixture. The moistened rice meal was packed into a cylindrical 3 inch (7.6 cm) diameter pVC pipe fitted at each end with galvanized sheet-metal disk electrodes which were compressed onto the moist dough, held in place, and connected to a Variac power supply. A 6 amp current was passed through the moist rice meal for 5.5 minutes, during which the internal temperature reached 215° F. (102° C.). After holding at this temperature for 2 minutes, the cooking cell was dismantled and the rice gel plug removed. The cooked, solid gel was very cohesive, plastic, and appeared evenly and thoroughly gelatinized.

Example 4C: HiCD Formation by Continuous Cooker Extruder. A number of experiments were conducted using a X-52 Wenger continuous pilot plant cooker extruder. Experience with various farinaceous materials (such as: wheat oats, corn, dried potatoes, rice, and combinations of the same) indicates that this equipment could be used for the production of the highly cohesive dough of this invention.

Example 4D: HiCD Formation from Conventionally Cooked Rice. Whole long-grain rice, 13.2 lbs (5.99 kg), was combined with 13.2 lbs (5.99 kg) of water in a Model HC44E Stephan batch cooker/processor. The mixture was heated bring the temperature to 215° F. (102° C.) and stirred gently every minute for 20 minutes. The rice was chopped with fixing blades at 450 rpm for 10 seconds, after which it was held in the closed mixer for 60 minutes to equilibrate the moisture.

A dry mixture for preparing the LoCDM comprised white corn meal, 3.82 lbs (1.73 kg); brownulated sugar, 322.3 and salt, 73.66 gm. The dry ingredients were place in a Stephan UM44E mixer and blended, after which the cooked rice was added together with a warmed mixture of 81.1 gm vegetable oil and 15.7 gm glycerol monooleate and mixed 10 seconds. Water, 2.11 lbs (0.96 kg), into which 1.62 gm of malt flavoring had been added, was added through a funnel over 20 seconds, after which the dough was mixed for 125 seconds.

The composite dough was then sheeted and fried following the procedure described in Examples 1A and 1B. Sample 4D1 was not surface dried and produced the wrinkled appearance of Example 1B. Sample 4D2 was surface dried as in Example 1A to yield a surface-bubbled crisper product.

From these results it was concluded that rice and other whole grains subjected to conventional cooking procedures used in grain processing could be used to prepare the highly cohesive dough component for use in the snack products of this invention. The cohesiveness of the HiCD and the characteristics of the fried snack can be adjusted by those familiar with the art through control of the moisture content of the grains and the cooking procedure used.

EXAMPLE 5

Pregelatinized farinaceous flour was evaluated for use in producing the highly cohesive (HiCD) portion of the snack formulation. Two experiments were made using a pregelatinized rice flour, specifically, Rice Gel L100, manufactured by Riviana Foods.

Example 5A: Sixteen (16) gm melted glycerol monooleate emulsifier was added to 9 lbs (4.1 kg) Rice Gel L100 and mixed on low speed in a Stephan UM44E mixer for 30 seconds. Cold tap water, 3.93 lbs (1.78 kg), was added over 20 seconds while mixing for a total of one minute. The mixer was tilted each 10 seconds after the water was added to achieve uniform distribution. The mixer was discharged, the material handblended, added back to the mixer, and mixed an additional 30 seconds more, while tilting the mixer each 10 seconds. The dough made from the hydrated rice gel was friable and soft, with relatively small agglomerates, mostly 5 mm or less in diameter.

For preparation of the LoCDM, a mixture of dry ingredients was prepared from LP/LL potato flakes, 5.63 lbs (2.56 kg); white corn meal, 3.44 lbs (1.56 kg); annatto/tumeric color, 0.31 gm; brownulated sugar, 284 gm; salt, 64.5 gm; and vegetable oil, 70.3 gm. The hydrated rice gel was placed in the Stephan mixer, after which the dry ingredients and 70.3 gm vegetable oil were placed over the rice gel and blended for 15 seconds. Malt syrup, 1.44 gm, was dispersed in 7.27 lbs (3.30 kg) of 80° F. (26.7° C.) water, and added over 20 seconds while mixing on low speed. Mixing was then continued for a total of 55 seconds, during which the mixer was tilted each 10 seconds to achieve uniformity.

The composite dough was sheeted, cut into dough preforms, predried, and fried using conditions of Example 1A Both the dough sheet and finished product looked typical of standard products such as Example 1. A sensory panel rated this sample as slightly lighter and more bubbled than Example 1A, with a slightly crisper texture, fewer particles, and overall very acceptable.

Example 5B: The hydrated rice gel, prepared as in 5A, was plasticized by pressing it through a Model 4146 Hobart meat grinder with a plate of 0.25 inch (6.4 mm) diameter round holes. During plasticization, the material increased in temperature 10° F. (5° C.) and was transformed to highly cohesive ropes indicating significant work input. The gel ropes were chopped in the Stephan UM44E mixer into pieces roughly ⅛ inch (3.2 mm) in diameter. These pieces were visibly more rubbery and cohesive than the rice gel agglomerates produced by the method of Example 1A. The chopped, plasticized rice gel was combined with the LoCDM ingredients as described in Example 5A. The gel pieces were noticeably larger, which resulted in a dough sheet with many small holes adjacent to the agglomerate particles. These particles were elongated by the action of the rollers, producing a distinct striated dough which was visually obvious. The fried product had a unique appearance: mottled, with lightly browned areas of dough interspersed with nearly white zones of rice gel. The sensory evaluation panel found the appearance less satisfactory and the texture harder than Example 5A, with chewy chunks. It was concluded that the plasticized rice gel was too cohesive as a result of too much work and that this could be easily remedied by one skilled in the art by reducing the amount of work imparted to the rice gel.

EXAMPLE 6

The procedure of Example 1B was used to produce a wrinkled undulating sheeted snack from dry corn ingredients. Conventional yellow corn meal was used to produce the HiCD in a fried corn snack formation. For this test in the Stephan HC44E cooker/processor, 20 lbs of corn meal were combined with 6 lbs of 80° F. (27° C.) water and processed as described in Example 1A. Steam was injected until a temperature of 230° F. (110° C.) was reached, after which it was maintained for 6 minutes. Earlier tests had shown that the cooking temperature of 210° F. (99° C.) used in Example 1 was not high enough with dry corn ingredients to form the desired cohesive dough (HiCD).

The processor was then vented and cooled as described in Example 1A.

For preparation of the LoCDM, a mixture of dry ingredients was prepared from pregelatinized corn meal (Illinois Cereal Mill code 965), 6.57 lbs (2.99 kg); amioca starch, 3.07 lbs (1.4 kg); LP/LL flakes, 1.19 lbs (0.54 kg); corn germ, 250.7 gm; sugar, 81.73 gm; salt, 86.86 gm; vegetable oil, 212.39 gm; and GMO, 24.51 gm.

After mixing 9.9 lbs (4.5 kg) of cooked corn HiCD and 7.8 lbs (3.5 kg) water with the LoCDM, the composite dough was discharged from the mixer and samples taken to determine the size of the cooked corn agglomerates as described in Example 2 and shown in Table 4 below. The dough was then sheeted and fried using the conditions of Example 2.

It was noted, when processing corn, that if the holding time was extended to 30 minutes between cooling and mixing to form the composite dough, the dough agglomerates disintegrated during the mixing into the LoCDM component. This is attributed to the high amylose content (29%) of corn versus relatively low amylose content of rice (18%). It was concluded that the amylose fraction of the corn starch had retrograded during the longer holding period, thus causing the HiCD agglomerates to lose their cohesive nature.

In spite of the larger particle size of the corn agglomerates in this test, the wrinkle measurements shown in Table 4 were slightly lower than those of the rice snack of Example 2. It was concluded that this was a result of partial retrogradation of the amylose portion of the corn gel.

TABLE 4

| Effect of Corn Dough Agglomerate Size on Wrinkling | |
|---|---|
| HiCD Agglomerate % | |
| on US ½, 12.7 mm | 0.4 |
| on US ⅜, 9.5 mm | 18.0 |
| on US ¼, 6.4 mm | 28.0 |
| on US 4, 4.7 mm | 23.2 |
| on US 10, 2.0 mm | 23.2 |
| through US 10, 2.0 mm | 7.2 |
| Average wrinkle height, mm | 2.91 |
| Panel wrinkle score | 2.8 |

EXAMPLE 7

Example 7A: The procedure of Example 2 was used to produce a wrinkled, undulated sheeted snack from dry potato ingredients. A commercially available, crushed dehydrated potato (CDP) was used to produce the highly cohesive dough (HiCD) in the snack formulation. CDP is made from dehydrated potato dice or slices which are ground to convenient size by conventional means. Prior to drying, the potatoes are given a light blanch to inactivate oxidative enzymes (Potato Processing, 4th Edition, Chapter 14, page 627). Earlier tests had demonstrated that dehydrated mashed potatoes, such as potato flakes, produced from totally cooked potatoes were not suitable for producing the highly cohesive gel.

Preparation of HiCD: Twenty (20) lbs (9.1 kg) of CDP and 6 lbs (2.7 kg) of 80° F. (27° C.) water were combined in the Stephan processor and processed as described in Example 2 using a cook temperature of 210° F. (99° C.) for 8 minutes. The processor was then vented and cooled as described in Example 2. The cooked potato gel was difficult to remove from the mixer, and it was concluded that a portion of the vegetable oil and glycerol monooleate should have been added to the CDP.

Preparation of LoCDM: A mixture of dry ingredients was prepared from 4.47 lbs (2.03 kg) LP/LL flakes, 1.61 lbs (0.73 kg) conventional retail flakes, 1.31 lbs (0.60 kg) CDP, 5.33 lbs (2.42 kg) raw potato starch, 158.01 gm salt, 142.14 gm vegetable oil, and 15.79 gm glycerol monooleate. The dry ingredients were added to the mixer, followed by 7.2 lbs (3.5 kg) cooked potato HiCD, the vegetable oil, and glycerol monooleate and mixed 15 seconds. While the mixer was running, 8.816 (4 kg) water was added over 20 seconds and mixing continued for 40 seconds more. After mixing the two dough components, the composite dough was discharged from the mixer and samples taken to determine the size of the cooked potato agglomerates as described in Example 2. These results are shown in Table 5.

Example 7B: A second sample was produced in which 5 lbs of the CDP was replaced with raw potato starch; process conditions and formulation were identical. The addition of the starch during the cooking process softened the cooked ingredient and increased the wrinkling of the fried product and the hardness of the elongated portions of the cooked ingredient in the fried snack product.

TABLE 5

Effect of Potato Dough Agglomerate Size on wrinkling

| EXAMPLE | | |
|---|---|---|
| HiCD Agglomerate % | | |
| on US ½, 12.7 mm | 0.8 | 0.7 |
| on US ⅜, 9.5 mm | 8.8 | 13.3 |
| on US ¼, 6.4 mm | 19.4 | 32.2 |
| on US 4, 4.7 mm | 12.0 | 5.8 |
| on US 10, 2.0 mm | 34.0 | 28.9 |
| through US 10, 2.0 mm | 25.0 | 19.1 |
| Average wrinkle height, mm | 2.65 | 3.15 |
| Panel wrinkle score | 2.3 | 3.8 |

In conclusion, the instant invention is a novel composite dough composition, and the methods of producing the same which, when sheeted, provide individual snack dough pieces having areas of contrasting composition and structure which, after frying, yield a snack with unique, non-uniform, discontinuous characteristics, among them texture, undulating surface, mouth appeal, taste, and color. Although each chip has common ingredients, the non-uniform distribution of those characteristics makes each chip unique!.

While several preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A process for forming a sheeted fried snack with discontinuous characteristics comprising:

a. forming a first gelatinized dough having a moisture content of about from 20%–40% by weight and a high degree of cohesion from starch-containing foodstuffs;

b. combining dry starch-containing ingredients separately from the first dough, which when mixed with water in a later step, will provide a second ungelatinized dough matrix with a moisture content of about 30%–70% by weight and a lower degree of cohesion than the first dough;

c. subdividing the first dough into portions having a range of random sizes and simultaneously distributing said random-sized portions throughout the second dough dry ingredients to provide a random mixture;

d. adding water to the random mixture to provide a composite dough exhibiting separate, distinguishable consistencies and rheological properties of the first and second doughs;

e. passing the composite dough between rollers to produce a sheeted composite dough with a non-uniform distribution of the randomly sized, first dough portions in the second dough matrix;

f. cutting the composite dough sheet into a multiplicity of snack-size dough pieces; and g. frying the dough pieces to produce a snack with discontinuous characteristics.

2. The process for forming the fried snack of claim 1 wherein step a., forming the first dough, includes the step of heating the starch-containing foodstuffs to a preferred final temperature higher than the gelatinization temperature of the starch contained therein and step b., forming the second dough, includes the step of keeping the second dough below the gelatinization temperature of the starch contained therein.

3. The process for forming a sheeted fried snack of claim 1 wherein, prior to step g., the snack-size dough pieces are surface dried to a predetermined degree of moisture loss.

4. The process for forming a sheeted fried snack of claim 1 wherein the predetermined range of random sizes of step c. is 5–30 mm in diameter.

5. The process for forming the sheeted fried snack of claim 1 wherein the starch-containing foodstuff of the first dough is rice.

6. The process for forming the sheeted fried snack of claim 5 wherein step a., forming a first dough, includes the step of adding additional raw starch to the rice ingredient.

7. The process for forming a sheeted fried snack of claim 1 wherein the first dough comprises about 10% to 70% of the composite dough and the second dough comprises about 30% to 90% of the composite dough.

8. The process for forming a sheeted fried snack of claim 7 wherein the first dough comprises 43.5 to 53.5% of the total combined composite dough mixture and the second dough comprises about 46.5 to 56.5% of the composite dough.

9. The process for forming a sheeted fried snack of claim 1 wherein the first dough contains a pre-gelatinized farinaceous foodstuff.

10. A fried snack made from snack-sized dough pieces comprising a random mixture of a first combination of gelatinized food ingredients having a moisture content of about 20%–40% by weight exhibiting first rheological properties and a second combination of ungelatinized food ingredients having a moisture content of about 30% to 70% by weight and exhibiting second rheological properties, and wherein the snack exhibits distinguishable, discontinuous characteristics throughout due to the separate, first and second rheological properties therein.

11. The fried snack of claim 10 wherein the first combination of food ingredients comprises substantially rice-based ingredients.

12. The fried snack of claim 10 wherein the first rheological properties of the first combination of ingredients includes a firm texture and the second rheological properties of the second combination of food ingredients includes a soft texture.

13. The fried snack of claim 10 wherein the random mixture of the first and second combinations of food ingredients creates stress within the snack dough pieces and differing degrees of shrinking during frying to provide a wrinkled, randomly shaped surface.

14. A process for forming a sheeted fried snack with discontinuous characteristics comprising:
  a. forming a first gelatinized dough phase having a moisture content of about from 20% to 40% by weight and a high degree of cohesion from starch-containing ingredients;
  b. forming a second ungelatinized dough phase having a moisture content of about 30%–70% by weight and a lower degree of cohesion from starch-containing ingredients;
  c. combining said first and second doughs to provide a composite dough exhibiting separate, distinguishable consistencies and rheological properties of the first and second dough phases;
  d. forming said composite dough into a dough sheet;
  e. cutting said dough sheet into a multiplicity of desired snack-sized dough pieces; and
  f. frying the dough pieces to produce a snack with discontinuous characteristics.

15. The process for forming a sheeted fried snack of claim 14 wherein, on a scale of 1 to 9, the first dough has a cohesion greater than 7 and the second dough has a cohesion less than 5.

16. The process for forming the fried snack of claim 14 wherein the first and second doughs are combined by limited mixing to provide a composite dough having a random distribution of the first dough within the second dough.

17. The process for forming a sheeted fried snack of claim 14 wherein the multiplicity of desired snack-sized dough pieces has a moisture content of 35–50% and, prior to step f., the snack-sized dough pieces are surface dried to a moisture content of 25–35%.

18. The process for forming a sheeted fried snack of claim 17 wherein the multiplicity of small-sized dough pieces has a moisture content of less than 2% after frying.

19. The process for forming a sheeted fried snack of claim 14 wherein one of the discontinuous characteristics is texture.

20. The process for forming a sheeted fried snack of claim 14 wherein one of the discontinuous characteristics is an undulating rippled surface.

21. The process for forming a sheeted fried snack of claim 14 wherein one of the discontinuous characteristics is mouth feel.

22. The process for forming a sheeted fried snack of claim 14 wherein one of the discontinuous characteristics is taste.

* * * * *